May 16, 1961  L. C. BANKER  2,984,041
FISH HOOK
Filed June 22, 1959

INVENTOR.
LOUIS C. BANKER
BY Hiram A. Sturges
Agent

United States Patent Office 2,984,041
Patented May 16, 1961

2,984,041
FISH HOOK
Louis C. Banker, Britt, Iowa
Filed June 22, 1959, Ser. No. 822,059
3 Claims. (Cl. 43—43.16)

This invention relates to fishing tackle, and particularly fish hooks; and in particular a fish hook having a pivotally mounted pointed member with latching means for retaining the pointed member in an operative position, and with a leader providing a pull cord attached to the latching means for releasing the point to facilitate removing the hook from a fish.

The purpose of this invention is to provide a fish hook that may be removed from a fish without gripping the fish by hand.

Fish hooks have been provided of various types and designs, and tools for holding the mouth of a fish open while removing a fish hook have been provided in different forms, however, with such devices it is necessary to grip the wet slippery fish in one hand as the hook is removed with the other, and it is very difficult to hold some types of fish.

With this thought in mind this invention contemplates a fish hook in which the pointed member is pivotally mounted on a supporting shank and in which the pointed member is retained in operative position by a latching section to which a pull cord is attached, and wherein upon the application of force to the latching section and base of the pointed member is released.

The object of this invention is, therefore, to provide means for pivotally mounting a pointed member on the end of a shank of a fish hook wherein the pointed member may be released to remove a fish from the hook.

Another object of the invention is to provide a fish hook having a pull cord actuated pivotally mounted pointed member whereby the hook may be removed from the mouth of a fish without handling the fish.

Another important object of the invention is to provide a fish hook having a releasable pointed member in which the point is instantly released, and readily reset.

A further object of the invention is to provide a fish hook having a pivotal pointed member retained in operative position by a latch in which the hook is of conventional size.

A still further object is to provide a fish hook having a latch actuated pivotally mounted pointed member in which the hook is of a simple and economical construction.

With these and other objects and advantages in view the invention embodies a shank having an eye on one end an arcuate support on the opposite end, a pointed member having an arcuate base pivotally mounted on the end of the arcuate support, a latching section pivotally connected to the base of the pointed member, and positioned to extend under a tooth on the inner surface of the shank, and a pull cord attached to the pivotal connection of the latching section to the base of the pointed member.

Other features and advantages of the invention will appear from the following description taken in connection with the drawings, wherein.

Figure 1:
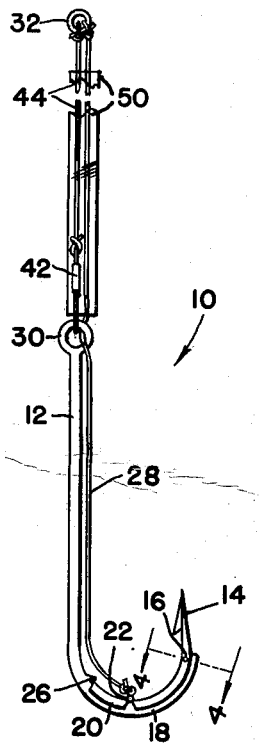
Figure 1 is a side elevational view of the fish hook having a releasable pointed member with the parts in a fishing position.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, numeral 12 indicating a shank of a fish hook, numeral 14 a pointed member pivotally mounted by a pin 16 on the end of an arcuate support 18 extended from the lower end of the shank 12, numeral 20 a latching section pivotally connected by a pin 22 to the base 24 of the pointed member 14, numeral 26 a tooth positioned to hold one end of the section 20, numeral 28 a pull cord attached to the pivotal connection of the section 20 to the base of the point, extended through an eye 30 on the upper end of the shank, and connected to a ring 32 to which a fishing line is attached.

Figure 4:
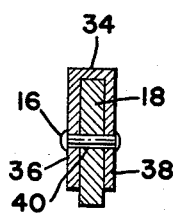
Figure 4 is a cross section through the pivotal mounting of the pointed member's base of the fish hook taken on line 4—4 of Figure 1 and with the parts shown on an enlarged scale.
Figure 5:
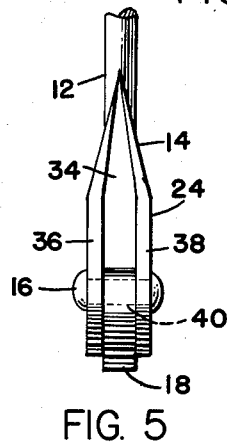
Figure 5 is a front elevational view of a fish hook having a pivotally mounted pointed member with the upper part of the shank of the hook broken away, and with the parts shown on an enlarged scale.

The body and base of the pointed member 14 are channel shaped in cross section, as shown in Figure 4, having a web 34 with side flanges 36 and 38, and the pin 16 extends through an eye 40 on the end of the arcuate support and through the flanges of the pointed member.

The eye at the upper end of the shank is provided with a swivel, snap hook or the like, as indicated by the numeral 42, and the device is connected to the ring 32 by a leader 44.

Figure 2:
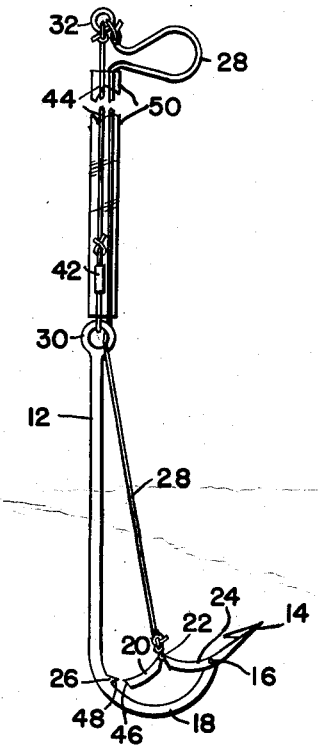
Figure 2 is a side elevational view similar to that shown in Figure 1 illustrating a partial movement of the pointed member and latching section with the pointed member moving to a fish releasing position.
Figure 3:
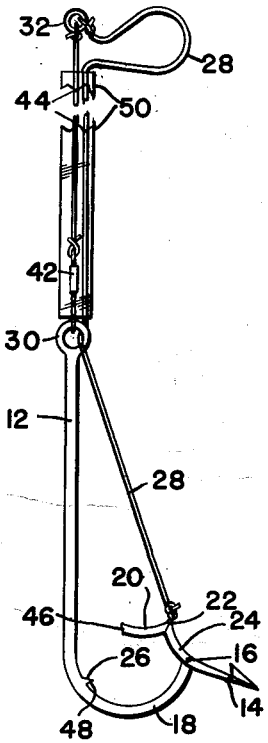
Figure 3 is also a side elevational view showing the fish hook with the pointed member in a full releasing position.

The latching section 20 is provided with a beveled end 46 and the tooth 26 is provided with a similar surface 48 whereby the parts are retained in operative positions, as shown in Figure 1, until a force is applied by the pull cord. A force applied by the pull cord collapses the latching section and base of the pointed member, as shown in Figures 2 and 3.

Figure 6:
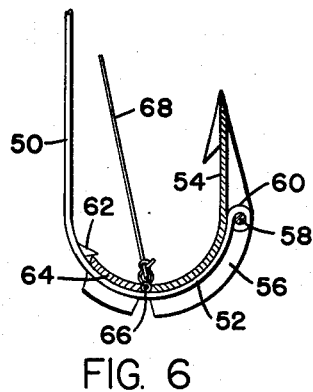
Figure 6 is a longitudinal section through a fish hook having a pivotally mounted pointed member, showing a modification wherein the shank is formed of wire.

In the design illustrated in Figure 6, a shank 50, of a round rod, wire, or the like is provided with an arcuate end section 52 to which a pointed member, channel-shaped in cross section and having a web 54 with side flanges 56, is connected by a pin 58, which extends through the flanges and also through an eye 60 on the end of the section 52. The shank 50 is provided with a tooth 62, similar to the tooth 26, and a latching section 64, pivotally connected to the end of the pointed member by a pin 66, is positioned to coact with the tooth to retain the parts in operative positions until the latching parts are collapsed by a force applied to the pull cord 68 attached to the hinge connecting the latching section to the base of the pointed member.

With the parts assembled as illustrated and described the hook is used in the conventional manner and after catching a fish thereon a force is applied to the pull cord causing the latching elements to collapse and thereby releasing the fish, so that the hook may be withdrawn from the mouth of the fish without gripping the fish by hand.

It is further my concept that the extended pull cord 28 be protected from being snagged on underwater obstacles or being caught by the fish during the bite or strike which would accidentally trip the hook resulting in the possibility of mis-operation and loss of a fish.

With the above object in view I propose to position an elongated sleeve 50 over the leader 44 and an upper portion of the pull cord 28.

The lower end of the sleeve 50 is positioned at a point adjacent the hook eye 30 and its upper end terminates at a point adjacent the ring 32 of the leader 44.

In Figures 1, 2 and 3 the sleeve is shown as it would appear in position on the device during operation.

As it will be seen, the sleeve 50 is preferably formed of a material having inherent resilient characteristics such as plastic or the like so that it will flex readily during use.

The sleeve is illustrated as being transparent in the drawing only for clarity and convenience.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A fish releasing fish hook comprising a shank having an eye on one end and having an arcuate supporting section extending from the opposite end, an arcuately shaped pointed member pivotally mounted on the end of said supporting section, an arcuate latching section pivotally connected to said pointed member and positioned to nest against the inner surface of said supporting section, a tooth on the supporting section and positioned to coact with the latching section for retaining the pointed member in a fish catching position, and a pull cord attached to the pointed member and latching section for collapsing the latching elements to release the hook.

2. In a releasing fish hook, the combination which comprises a shank having an eye on one end and an arcuate hook supporting section on the opposite end, an arcuately shaped pointed member pivotally mounted on the arcuate supporting section, a tooth on the supporting section, an arcuate latching section hinged to the pointed member and positioned to coact with the tooth for retaining the pointed member in a fish catching position with the latching section and pointed member nested against the inner surface of said arcuate hook supporting section, and means for collapsing the latching elements to release the pointed member.

3. In a fish hook, the combination which comprises an elongated shank having an eye at one end and an arcuate support extended from the opposite end, an arcuately shaped pointed member hinged to the extended end of the arcuate support, an arcuate latching section hinged to the pointed member, a pull cord attached to the pointed member and latching section and extended through the eye on the end of the shank, a tooth on the arcuate support for retaining the latching section and pointed member in fish catching position with the arcuate latching section and pointed member nested against the inner surface of said arcuate support, a ring on the end of the pull cord opposite to the end attached to the latching section and pointed member, and a leader having a snap therein connecting the ring to the eye of the shank.

References Cited in the file of this patent
UNITED STATES PATENTS

| | | |
|---|---|---|
| 499,118 | Isachson | June 6, 1893 |
| 961,259 | Reither | June 14, 1910 |
| 2,501,210 | Cretin | Mar. 21, 1950 |
| 2,815,603 | Bandemer | Dec. 10, 1957 |